United States Patent Office 3,461,310
Patented Aug. 12, 1969

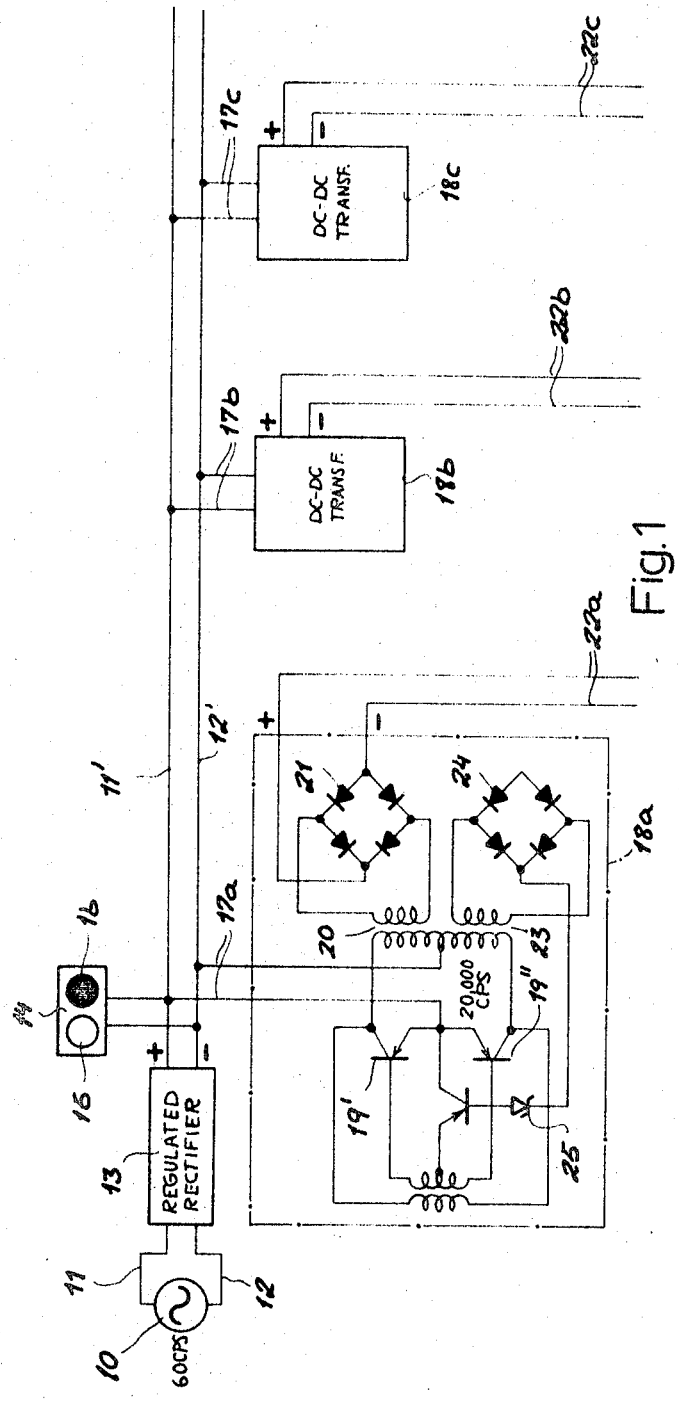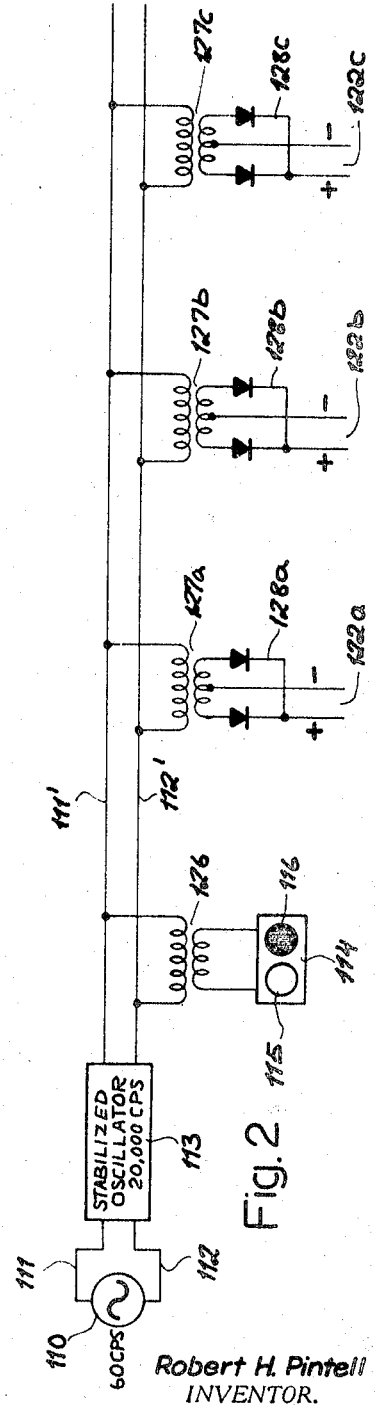

3,461,310
MULTIPLE-OUTPUT POWER SUPPLY
Robert H. Pintell, Congers, N.Y., assignor to Intron International, Inc., Congers, N.Y., a corporation
Filed July 24, 1967, Ser. No. 655,437
Int. Cl. H02m 7/20
U.S. Cl. 307—151
8 Claims

ABSTRACT OF THE DISCLOSURE

Power supply for the energization of a multiplicity of load circuits with direct current at reduced voltage from a low-frequency (e.g., 60-cycle) input line which feeds a preregulator common to all the load circuits; each lead circuit includes an individual high-frequency stepdown transformer, operating preferably in the kilocycle range, followed by a rectifier. The high-frequency input voltage for the several transformers is obtained either from a common generator in the input line, connected to or forming part of the preregulator, or from individual oscillators in the several output lines of the preregulator leading to the respective load circuits. Absence of iron-core stepdown transformers operating at low frequency reduces losses and improves regulation.

SPECIFICATION

My present invention relates to a power supply for the energization of a multiplicity of load circuits with direct current, e. g., as used in high-speed computers.

In such systems it is frequently necessary to supply 10 or 20 separate loads with D-C voltages ranging, say, from 1 to 50 volts at load currents of, for example, 10 milliamperes to 60 amperes, this energy being taken from the usual utility mains delivering alternating current of 50 or 60 cycles per second at a terminal voltage of about 95 to 135 volts.

It is essential for flawless performance that interaction between the several load circuits be held to a minimum and that the supply voltage be highly stabilized under all possible load conditions. These requirements have heretofore been satisfied only imperfectly or with complex and cumbersome circuitry.

One of the principal sources of imperfect line regulation and objectionable power losses is the presence of the usual stepdown transformers which, since they must operate at the low mains frequency, are equipped with ferromagnetic cores subject to the phenomenon hysteresis. My invention aims at providing an improved power supply, of the character described, avoiding the need for iron-core transformers.

This object is realized, pursuant to the present invention, by the provision of one or more high-frequency generators connected either in the common supply line or in the individual output lines leading to the several load circuits; the necessary voltage reduction is obtained by respective stepdown transformers which operate at the high-frequency level and may therefore be designed without iron cores. The reduced-voltage high-frequency oscillation is thereupon rectified to furnish the desired load energy.

A stabilizer for the suply voltage common to all the load circuits is preferably connected in the input line ahead of its junction with the several branch lines feeding the load circuits. This stabilizer may take the form of a regulated rectifier circuit known per se. If a common oscillator is used in the supply lines, the regulator may precede the oscillator or may form part thereof.

A power supply according to my invention may be incorporated in a module of small dimensions for use in computer systems of the type referred to above. Advantageously, a monitoring lamp or other signaling device may be connected in or across such power supply, preferably beyond the preregulator thereof, to indicate the proper functioning of the system.

The invention will be described in greater detail with reference to the accompanying drawing in which FIGS. 1 and 2 diagrammatically illustrate two representative embodiments.

In FIG. 1 I have shown a low-frequency current source 10 of 60 cycles connected across a pair of bus bars 11, 12. A regulated rectifier 13, e.g., of the type shown on page 8–76 of "A Handbook of Selected Semiconductor circuits," Dept. of the Navy, Bureau of Ships, identified as NObsr 73231, converts the alternating current on line 11, 12 into a direct current on two extension bus bars 11', 12'. Connected across these bus bars is an indicator 14 with two monitoring lamps of which one, e.g., lamp 15, lights when the rectifier 13 is energized and the other, e.g., lamp 16, is lit whenever the output voltage is above or below a predetermined operating range.

A multiplicity of branch lines, of which only three have been indicated at 17a, 17b and 17c, are connected in parallel across bus bars 11', 12'. Each of these branch lines feeds a direct-current transformer 18a, 18b, 18c which may be of the type disclosed in my U.S. Patent Ser. No. 2,968,738 and which I have here illustrated by a simplified circuit diagram in the case of transformer 18a. As shown, this direct-current transformer comprises a square-wave oscillator consisting of two transistors 19', 19" connected across the D-C supply 11', 12'; a stepdown transformer 20, followed by a rectifier 21, produces a direct-current output in a load circuit 22a while another such transformer 23 and rectifier 24 stabilize the feedback of the oscillator 19', 19" via a Zener diode 25. Reference is made to my above-identified prior patent for a full description of the operation of this system.

In analogous manner, transformers 18b and 18c energize respective load circuits 22b and 22c.

The operating frequency of oscillation generator 19', 19" should be between about 10 and 1000 times that of source 10, preferably in the kilocycle range, to take full advantage of the low-loss performance of coreless or ferrite transformers such as those shown at 20 and 23.

In FIG. 2 I have shown the low-frequency power supply 110 connected via input line 111, 112 across a stabilizing oscillator 113 which may be a sine-wave generator, e.g., as disclosed in my U.S. Patent No. 3,026,486; oscillator 113 may be provided with a regulated rectifier, as shown at 13 in FIG. 1, or may be directly stabilized in a manner known per se to act as the preregulator of FIG. 1. This oscillator, like the oscillation generator 19', 19" of the preceding embodiment, may operate in the kilocycle range, e.g., at 20,000 c.p.s. It energizes bus bars 111', 112' across which an indicator 114 with lamps 115, 116 is connected via an air-core or ferrite transformer 126. A multiplicity of other such transformers 127a, 127b, 127c (only three shown) are connected in parallel across line 111', 112' and, via respective rectification networks 128a, 128b and 128c, drive the associated load circuits 122a, 122b, 122c.

Naturally, the principles herein disclosed may be embodied in other circuits utilizing my novel technique without departing from the spirit and scope of this invention as defined in the appended claims.

The systems herein disclosed operate with better than 80% efficiency at highly favorable ratios of power versus volume and weight.

I claim:
1. A power supply for the energization of a multiplicity of load circuits, comprising a low-frequency input line; a multiplicity of output lines each connected to a respective load circuit; coupling means between said input and output lines including high-frequency oscillator means; an individual high-frequency stepdown transformer in each of said output lines; and rectifier means beyond said transformer in each of said output lines.

2. A power supply as defined in claim 1, further comprising a preregulator in said input line.

3. A power supply as defined in claim 1 wherein said oscillator means comprises an oscillation generator in said input line common to all of said output lines.

4. A power supply as defined in claim 3 wherein said oscillation generator is a stabilized oscillator.

5. A power supply as defined in claim 1 wherein said oscillator means comprises an individual oscillator in each output line ahead of said transformer.

6. A power supply as defined in claim 5 wherein said individual oscillator is a square-wave generator.

7. A power supply as defined in claim 1 wherein the frequency of said oscillator means is on the order of 10 to 1000 times the supply frequency of said input line.

8. A power supply as defined in claim 1, further including signaling means connected to said coupling means for visually indicating the operating condition thereof.

References Cited

UNITED STATES PATENTS

| | | | |
|---|---|---|---|
| 2,886,898 | 5/1959 | Karlson | 321—4 |
| 2,968,738 | 1/1961 | Pintell | 307—150 |
| 3,089,992 | 5/1963 | Seney | 321—4 |

ROBERT K. SCHAEFER, Primary Examiner

H. J. HOHAUSER, Assistant Examiner

U.S. Cl. X.R.

307—11; 321—4